United States Patent
Koo et al.

(10) Patent No.: US 8,989,115 B2
(45) Date of Patent: Mar. 24, 2015

(54) METHOD FOR TRANSMITTING PRECODING MATRIX INFORMATION AND USER DEVICE, AND METHOD FOR TRANSMITTING DATA TO PLURALITY OF USER DEVICES AND BASE STATION

(75) Inventors: Ja Ho Koo, Anyang-si (KR); Wook Bong Lee, Anyang-si (KR); Jae Hoon Chung, Anyang-si (KR); Bin Chul Ihm, Anyang-si (KR); Moon Il Lee, Anyang-si (KR)

(73) Assignee: LG Electronics Inc., Seoul (KR)

( * ) Notice: Subject to any disclaimer, the term of this patent is extended or adjusted under 35 U.S.C. 154(b) by 367 days.

(21) Appl. No.: 13/511,596
(22) PCT Filed: Nov. 25, 2010
(86) PCT No.: PCT/KR2010/008397
§ 371 (c)(1),
(2), (4) Date: May 23, 2012
(87) PCT Pub. No.: WO2011/065763
PCT Pub. Date: Jun. 3, 2011

(65) Prior Publication Data
US 2013/0083743 A1 Apr. 4, 2013

Related U.S. Application Data

(60) Provisional application No. 61/264,844, filed on Nov. 30, 2009.

(30) Foreign Application Priority Data

Jun. 11, 2010 (KR) .................. 10-2010-0055385

(51) Int. Cl.
*H04B 7/04* (2006.01)
*H04B 7/06* (2006.01)
*H04L 25/03* (2006.01)

(52) U.S. Cl.
CPC ............ *H04B 7/0478* (2013.01); *H04B 7/0456*

(Continued)

(58) Field of Classification Search
USPC ........................................... 370/329
See application file for complete search history.

(56) References Cited

U.S. PATENT DOCUMENTS 8,644,422 B2 * 2/2014 Gao et al. .................. 375/316
2003/0185309 A1 * 10/2003 Pautler et al. ............. 375/257

(Continued)

FOREIGN PATENT DOCUMENTS

| CN | 1013996400 A | 4/2009 |
| CN | 101425830 A | 5/2009 |
| WO | WO 2009/128604 A1 | 10/2009 |

OTHER PUBLICATIONS

Alcatel-Lucent "UE PMI feedback signalling for user pairing/coordination" Feb. 9, 2009.*

(Continued)

*Primary Examiner* — Dang Ton
*Assistant Examiner* — Robert M Morlan
(74) *Attorney, Agent, or Firm* — Birch, Stewart, Kolasch & Birch, LLP

(57) ABSTRACT

The present invention relates to a precoding matrix information transmission method and a user device, and provides a method for transmitting precoding matrix information by a particular user device among user devices that receive a signal transmitted from one base station. The method comprises the steps of: determining, from a predetermined codebook, a first precoding matrix which is a precoding matrix for the particular user device during signal reception, and determining one or more second precoding matrices for the other user devices which are to be multiplexed in a predetermined resource region with the particular user device, wherein the one or more second precoding matrices are determined within a codebook subset of the predetermined codebook linked with the first precoding matrix; and transmitting, to the base station, first precoding matrix information indicating the first precoding matrix and second precoding matrix information indicating the one or more second precoding matrices.

18 Claims, 8 Drawing Sheets

(52) U.S. Cl.
CPC (LDR) (2013.01); *H04B 7/0452* (2013.01); *H04B 7/063* (2013.01); *H04B 7/0632* (2013.01); *H04L 25/03898* (2013.01)
USPC ........................................................ 370/329

(56) References Cited

U.S. PATENT DOCUMENTS

2009/0080549 A1* 3/2009 Khan et al. .................... 375/260
2010/0254474 A1* 10/2010 Gomadam et al. ............ 375/267

OTHER PUBLICATIONS

Alcatel-Lucent, "UE PMI feedback signaling for user pairing/coordination", 3GPP TSG RAN WG1 #55bis Meeting, Jan. 12-16, 2009, R1-090051, pp. 1-3.

Alcatel-Lucent, "Best companion reporting for improved single-cell MU-MIMO pairing", 3GPP TSG RAN WG1 #58 Meeting, Aug. 24-28, 2009, R1-093333, pp. 1-5.

Grieco et al., "Uplink Single-User Mimo for 3GPP LTE," 18th Annual IEEE International Symposium on Personal, Indoor and Mobile Radio Communications (PIMRC'07), Sep. 7, 2007, 5 pages.

Liu et al., "A Multi-Stage Hybrid Scheduler for Codebook-Based Precoding System," 2008 IEEE Wireless Communications and Networking Conference (WCNC 2008), Apr. 3, 2008, pp. 1804-1808.

Ribeiro et al., "Performance of Linear Multi-User MIMO Precoding in LTE System," 2008 3rd International Symposium on Wireless Pervasive Computing (ISWPC 2008), May 9, 2008, pp. 410-414.

* cited by examiner

FIG. 8

| Codebook index | Precoding Matrix |
|---|---|
| 0 | $W_0$ |
| 1 | $W_1$ |
| 2 | $W_2$ |
| 3 | $W_3$ |
| 4 | $W_4$ |
| 5 | $W_5$ |
| 6 | $W_6$ |
| 7 | $W_7$ |
| 8 | $W_8$ |
| 9 | $W_9$ |
| 10 | $W_{10}$ |
| 11 | $W_{11}$ |
| 12 | $W_{12}$ |
| 13 | $W_{13}$ |
| 14 | $W_{14}$ |
| 15 | $W_{15}$ |

METHOD FOR TRANSMITTING PRECODING MATRIX INFORMATION AND USER DEVICE, AND METHOD FOR TRANSMITTING DATA TO PLURALITY OF USER DEVICES AND BASE STATION

This application is the National Phase of PCT/KR2010/008397 filed on Nov. 25, 2010, which claims priority under 35 U.S.C. 119(e) to U.S. Provisional Application No. 61/264,844 filed on Nov. 30, 2009, and under U.S.C. 119(a) to Patent Application No. 10-2010-0055385 filed in the Republic of Korea on Jun. 11, 2010, all of which are hereby expressly incorporated by reference into the present application.

TECHNICAL FIELD

The present invention relates to a wireless communication system, and more particularly, to a method and apparatus for reducing co-channel interference among a plurality of user equipments (UEs) when a signal is simultaneously transmitted to the plurality of UEs.

BACKGROUND ART

Recently, a Multiple Input Multiple Output (MIMO) system becomes a focus of attention as a wideband wireless mobile communication technology. The MIMO system refers to a system capable of improving data communication efficiency using multiple antennas.

The MIMO system may be classified into a space multiplexing scheme and a space diversity scheme, depending on whether or not the same data is transmitted. The space multiplexing method refers to a scheme for simultaneously transmitting different data via a plurality of transmission antennas so as to transmit data at a high transmit rate without increasing system bandwidth. The space diversity scheme refers to a scheme for transmitting the same data via a plurality of transmission antennas so as to obtain transmit diversity. Examples of such a space diversity scheme include a space time channel coding scheme.

In addition, the MIMO system may be classified into a single user (SU)-MIMO scheme and a multiple user (MU)-MIMO scheme depending on how many users are allocated to the same time/frequency area. A part having a time/frequency area is referred to as a resource area. One user may be allocated to one resource area in the SU-MIMO scheme and multiple users may be allocated to one resource area in the MU-MIMO scheme. In general, performance of the SU-MIMO scheme is good when the number of users is small and performance of the MU-MIMO scheme is good when the number of users is large.

In addition, the SU-MIMO and the MU-MIMO system may be classified into an open loop scheme and a closed loop scheme depending on whether or not channel information is fed back from a reception side to a transmission side. The open loop scheme includes a Space-Time Trellis Code (STTC) scheme in which a transmission side transmits information in parallel, and a reception side detects a signal by repeatedly using a Zero Forcing (ZF) scheme and a Minimum Mean Square Error (MMSE) scheme and obtains transmit diversity and coding gain using a space domain and Bell Laboratories Layered Space-Time (BLAST) for increasing information amount by the number of transmission antennas, or the like. The closed loop scheme refers to a scheme in which a receiver estimates a radio channel state and transmits the estimated channel state to a transmitter in the form of appropriate feedback information and the transmitter controls channel quality in consideration of the channel state acquired from the feedback information. The closed loop scheme includes a Transmit Antenna Array (TxAA) scheme, or the like.

UEs which perform an MU-MIMO scheme in the same resource area operate on a group-by-group basis. Channel performance may be deteriorated due to co-channel interference between UEs. Accordingly, there is a need for a method for reducing co-channel interference between UEs which perform a MIMO scheme in the same resource area.

DISCLOSURE

Technical Problem

An object of the present invention is to provide a method and apparatus capable of reducing co-channel interference between user equipments (UEs).

Another object of the present invention is to provide a method and apparatus capable of reducing feedback overhead by reducing the amount of feedback information transmitted from a UE to a base station.

The technical problems solved by the present invention are not limited to the above technical problems and those skilled in the art may understand other technical problems from the following description.

Technical Solution

The object of the present invention can be achieved by providing a method of transmitting precoding matrix information at a user equipment (UE) among a plurality of UEs in a wireless communication system in which the plurality of UEs simultaneously receives a signal from one base station, the method including determining, from a predetermined codebook, a first precoding matrix which is a precoding matrix for the UE during reception of the signal and determining one or more second precoding matrices for other UEs to be multiplexed in a predetermined resource area with the UE, the one or more second precoding matrices being determined within a codebook subset of the predetermined codebook associated with the first precoding matrix, and transmitting first precoding matrix information indicating the first precoding matrix and second precoding matrix information indicating the one or more second precoding matrices to the base station.

In another aspect of the present invention, there is provided a user equipment (UE) among a plurality of UEs transmitting precoding matrix information in a wireless communication system in which the plurality of UEs simultaneously receive a signal from one base station, including a transmitter configured to transmit a signal to the base station, and a processor configured to determine, from a predetermined codebook, a first precoding matrix which is a precoding matrix for the UE during reception of the signal and to determine one or more second precoding matrices for other UEs to be multiplexed in a predetermined resource area with the UE, wherein the one or more second precoding matrices are determined within a codebook subset of the predetermined codebook associated with the first precoding matrix, and control the transmitter to transmit first precoding matrix information indicating the first precoding matrix and second precoding matrix information indicating the one or more second precoding matrices to the base station.

In another aspect of the present invention, there is provided a method of transmitting data at a base station in a wireless communication system in which one base station simultaneously transmits a signal to a plurality of user equipments (UEs), the method including receiving first precoding matrix information indicating a first precoding matrix which is a precoding matrix for a UE determined from the plurality of UEs within a predetermined codebook and second precoding matrix information indicating one or more second precoding matrices determined within a codebook subset of the predetermined codebook associated with the first precoding matrix as precoding matrices for other UEs to be multiplexed in a predetermined resource area with the UE, selecting a precoding matrix for data to be transmitted to each UE in the predetermined resource area based on the first precoding matrix information and the second precoding matrix information, and precoding the data to be transmitted to each UE using the selected precoding matrix and transmitting the data to each UE in the predetermined resource area.

In another aspect of the present invention, there is provided a wireless communication system in which one base station simultaneously transmits a signal to a plurality of user equipments, including an antenna configured to receive first precoding matrix information indicating a first precoding matrix which is a precoding matrix for a UE determined from the plurality of UEs within a predetermined codebook and second precoding matrix information indicating one or more second precoding matrices determined within a codebook subset of the predetermined codebook associated with the first precoding matrix as precoding matrices for other UEs to be multiplexed in a predetermined resource area with the UE, a precoder configured to precode data to be transmitted, and a processor configured to select a precoding matrix for data to be transmitted to each UE in the predetermined resource area based on the first precoding matrix information and the second precoding matrix information, control the precoder to precode the data to be transmitted, and control the antenna to transmit the precoded data to each UE in the predetermined resource area.

The second precoding matrix information may include indexes of the second precoding matrices defined in the codebook subset.

The first precoding matrix information may include an index of the first precoding matrix defined within the predetermined codebook or include information indicating the codebook subset among codebook subsets belonging to the predetermined codebook and an index of the first precoding matrix defined in the codebook subset.

The second precoding matrix information may include information indicating one of patterns according to which the precoding matrices within the codebook subset are prioritized.

Information indicating the codebook subset among codebook subsets belonging to the predetermined codebook and information indicating one of patterns according to which precoding matrices within the codebook subset are prioritized may be transmitted to the base station as the first and second precoding matrix information.

The codebook subset may include the first precoding matrix and a precoding matrix having a predetermined correlation value or less with the first precoding matrix.

Advantageous Effects

According to the embodiments of the present invention, it is possible to reduce co-channel interference through feedback information transmitted between a user equipment (UE) and a base station.

In addition, it is possible to reduce feedback overhead by reducing the amount of feedback information transmitted between a UE and a base station.

The effects of the present invention are not limited to the above-described effects and other effects which are not described herein will become apparent to those skilled in the art from the following description.

DESCRIPTION OF DRAWINGS

FIG. 8 is a table showing an example of a 4-bit codebook.

BEST MODEL

Reference will now be made in detail to the preferred embodiments of the present invention, examples of which are illustrated in the accompanying drawings. The detailed description set forth below in connection with the appended drawings is intended as a description of exemplary embodiments and is not intended to represent the only embodiments through which the concepts explained in these embodiments can be practiced. The detailed description includes details for the purpose of providing an understanding of the present invention. However, it will be apparent to those skilled in the art that these teachings may be implemented and practiced without these specific details. For example, although, in the following description, it is assumed that the mobile communication system is a $3^{rd}$ Generation Partnership Project (3GPP) Long Term Evolution (LTE) system, the present invention is applicable to other mobile communication systems excluding the unique matters of the 3GPP LTE system.

In some instances, well-known structures and devices are omitted in order to avoid obscuring the concepts of the present invention and the important functions of the structures and devices are shown in block diagram form. The same reference numbers will be used throughout the drawings to refer to the same or like parts.

Figure 1:
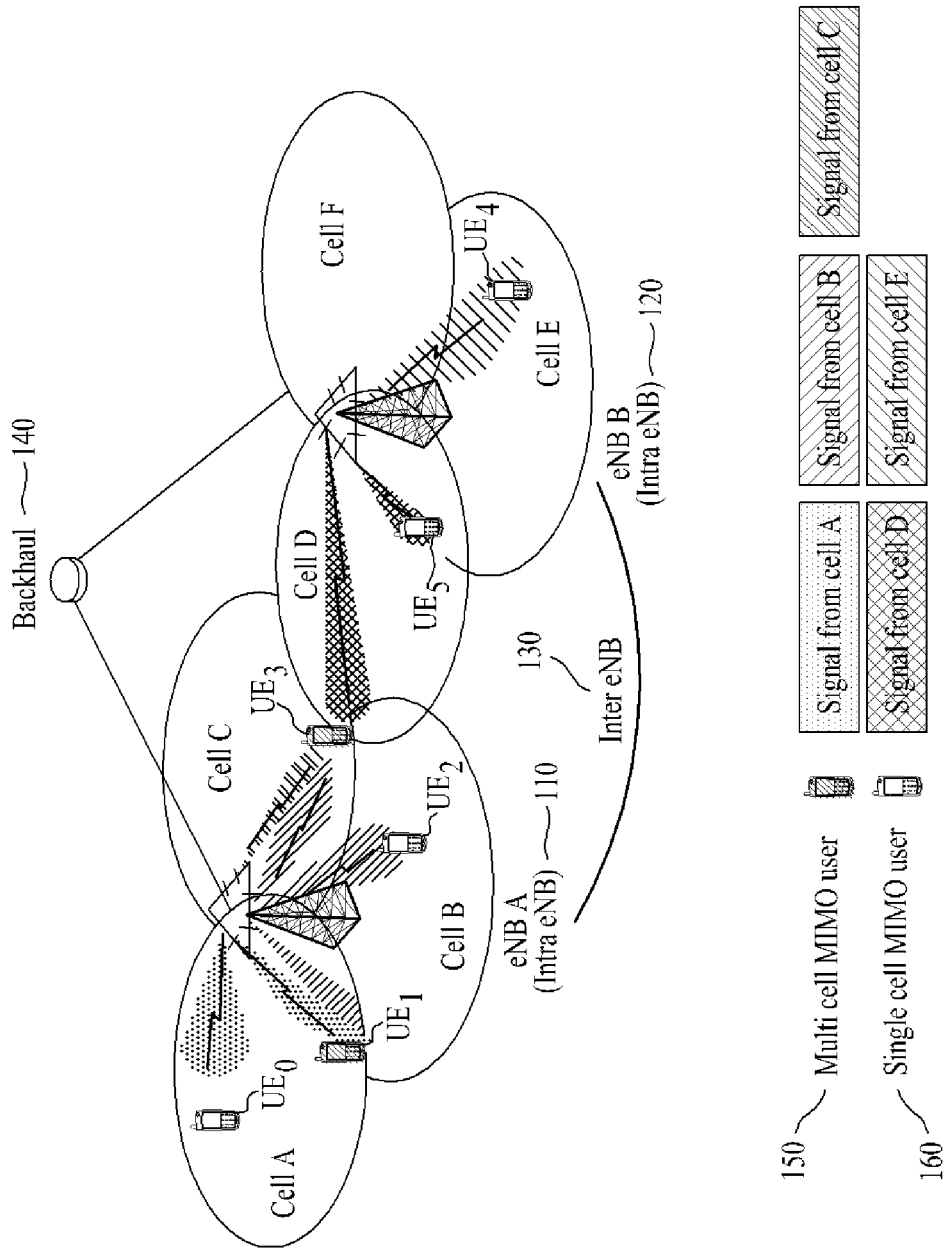
FIG. 1 is a conceptual diagram showing a wireless communication system to which the present invention is applicable.

FIG. 1 is a conceptual diagram showing a wireless communication system to which the present invention is applicable. The wireless communication system includes one or more base stations (BSs) 11. Each BS 110, 120 or 130 provides a communication service to a UE located in a specific geographical area (generally referred to as a cell) (a cell A, a cell B, . . . , or a cell F). A UE may be fixed or mobile and various equipments which communicate with a BS so as to transmit and receive user data and/or a variety of control information may be UEs. The UE may be referred to as a terminal equipment, a mobile station (MS), a mobile terminal (MT), a user terminal (UT), a subscriber station (SS), a wireless device, a personal digital assistant (PDA), a wireless modem, a handheld device, etc. A BS refers to a fixed station which communicates with a UE and/or another BS and exchanges a variety of data and control information. The BS may be referred to as an evolved-NodeB (eNB), a base transceiver system (BTS), an access point (AP), etc.

In a multi-cell environment, intra BSs 110 and 120 and an inter BS 130 exist. The intra BS includes several cells (or sectors). Cells which share the same BS as a cell to which a specific UE belongs correspond to the intra BSs 110 and 120 with respect to the cell to which the specific UE belongs, and cells belonging to different BSs correspond to the inter BS 120 with respect to the cell to which the specific UE belongs. With respect to a specific cell, an intra BS may also be referred to as a serving BS and an inter BS may also be referred to as a neighboring BS. Cells based on the same BS as a specific UE exchange information (e.g., data, channel quality control information) via an x2 interface and cells based different BSs may exchange inter-cell information via a backhaul 140. As shown in FIG. 1, a single cell MIMO user 160 may communicate with one BS in one cell (sector) and a multi cell MIMO user 150 located at a cell boundary may communicate with a plurality of BSs in multiple cells (sectors). For example, the single cell MIMO user 160 UE0 may communicate with an eNB A in the cell A, a UE2 may communicate with the eNB A in the cell B, a UE4 may communicate with the eNB B in the cell E, and a UE5 may communicate with the eNB B in the cell D. The multi-cell MIMO user 150 UE1 may communicate with the eNB A in the cell A and the cell C and the UE3 may communicate with the eNB B in the cell D while communicating with the eNB A in the cell B and the cell C.

Figure 2:
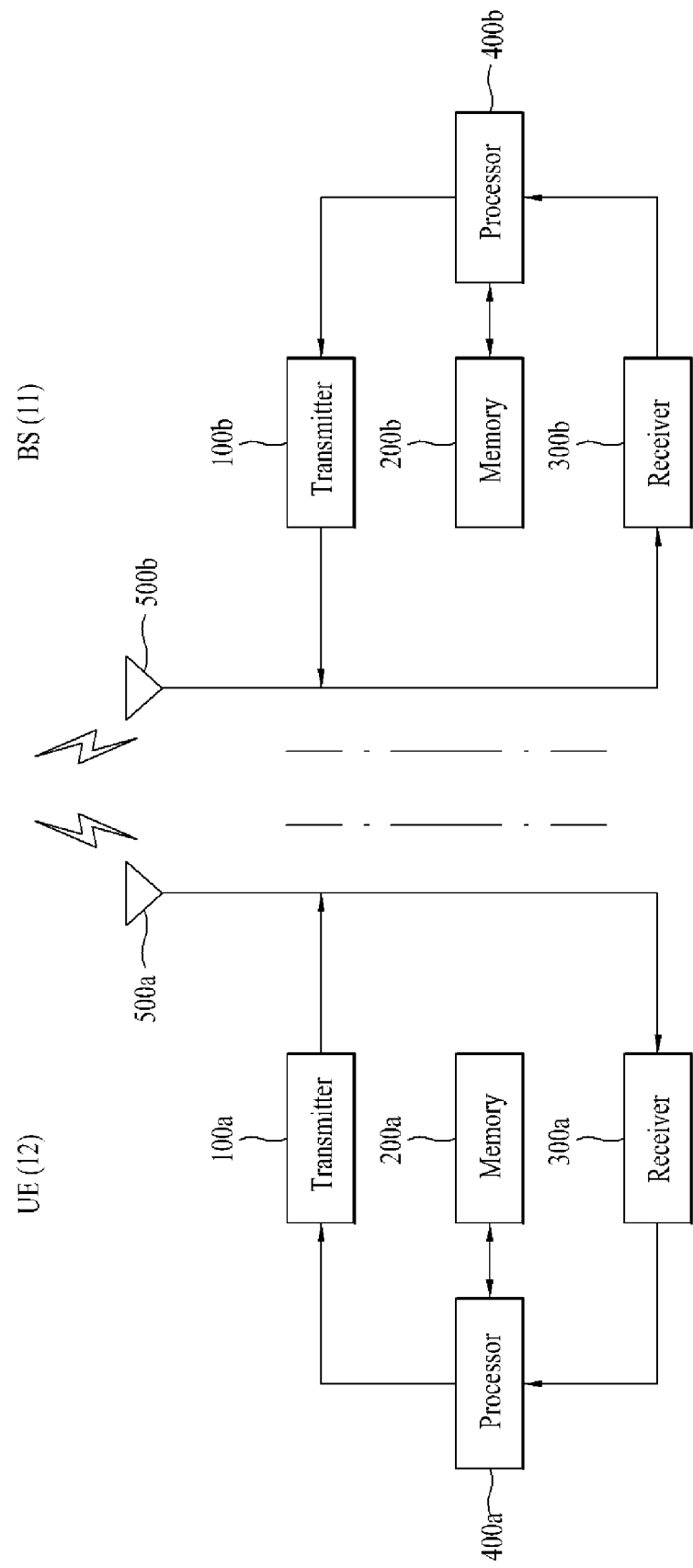
FIG. 2 is a block diagram showing components of a user equipment (UE) and a base station which perform the present invention.

FIG. 2 is a block diagram showing components of a UE and a BS which perform the present invention.

The UE 12 may operate as a transmitter in uplink and operate as a receiver in downlink. The BS 11 may operate as a receiver in uplink and operate as a transmitter in downlink.

The UE 12 and the BS 11 include antennas 500a and 500b for receiving information, data, signals, and/or messages, transmitters 100a and 100b for transmitting messages by controlling the antennas, receivers 300a and 300b for receiving messages by controlling the antennas, and memories 200a and 200b for storing a variety of information associated with communication in the wireless communication system, respectively. The UE 12 and the BS 11 further include processors 400a and 400b, respectively, which are configured to perform the present invention by controlling the components of the UE 12 and the BS 11, such as the transmitters, the receivers and the memories. The transmitter 100a, the memory 200a, the receiver 300a, and the processor 400a in the UE 12 may be configured as independent components on separate chips or one or more components may be incorporated into a single chip. Likewise, the transmitter 100b, the memory 200b, the receiver 300b and the processor 400b in the BS 11 may be configured as independent components on separate chips or one or more components may be incorporated into a single chip.

The antennas 500a and 500b transmit signals generated from the transmitters 100a and 100b to external devices, or transfer radio signals received from the external devices to the receivers 300a and 300b. A transmission/reception module supporting a Multiple Input Multiple Output (MIMO) function for transmitting and receiving data using a plurality of antennas may be connected to two or more antennas.

The processors 400a and 400b generally provide overall control to the modules of the UE 12 and the BS 11. Especially, the processors 400a and 400b may carry out various control functions for performing the present invention, a Medium Access Control (MAC) frame variable control function based on service characteristics and a propagation environment, a power saving mode function for controlling idle-mode operations, a handover function, and an authentication and encryption function. The processors 400a and 400b may also be referred to as controllers, microcontrollers, microprocessors, microcomputers, etc. The processors 400a and 400b may be configured as hardware, firmware, software, or a combination thereof. If the present invention is implemented using hardware, the processors 400a and 400b may be provided with one or more Application Specific Integrated Circuits (ASICs), Digital Signal Processors (DSPs), Digital Signal Processing Devices (DSPDs), Programmable Logic Devices (PLDs), and/or Field Programmable Gate Arrays (FPGAs), which are configured to perform the present invention. If the present invention is implemented using firmware or software, firmware or software may be configured to include a module, a procedure, a function, etc. for performing functions or operations of the present invention. The firmware or software configured to perform the present invention may be provided in the processors 400a and 400b, or may be stored in the memories 200a and 200b and executed by the processors 400a and 400b.

The transmitters 100a and 100b perform predetermined coding and modulation upon signals and/or data, which are scheduled by the processors 400a and 400b and transmitted to the external devices, and then transfer the modulated signals and/or data to the antennas 500a and 500b. For example, the transmitters 100a and 100b convert a transmission data stream into K signal streams by demultiplexing, channel coding, modulation, etc. The K signal streams are transmitted through the antennas 500a and 500b after being processed in transmission processors of the transmitters 100a and 100b. The transmitters 100a and 110b and the receivers 300a and 300b of the UE 12 and the BS 11 may be differently configured according to a procedure of processing a transmitted signal and a received signal.

Figure 3:
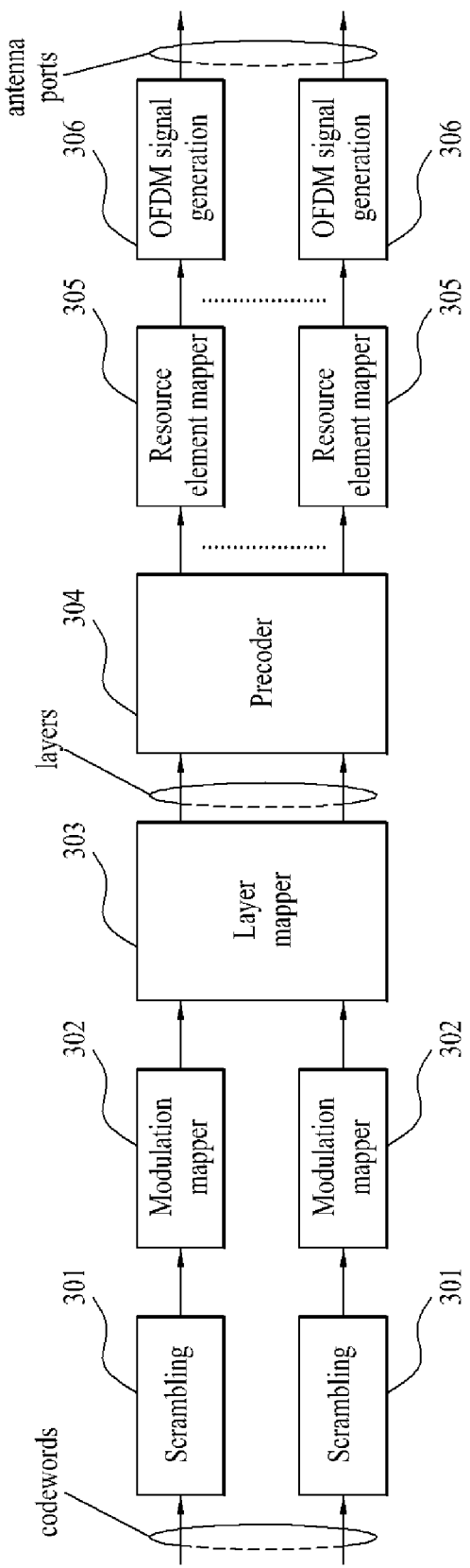
FIG. 3 is a diagram showing a signal processing procedure according to an orthogonal frequency division multiple access (OFDMA) scheme.

FIG. 3 is a diagram showing a signal processing procedure according to an orthogonal frequency division multiple access (OFDMA) scheme.

A transmitter of a UE or a BS may transmit one or more codewords. The one or more codewords may be scrambled by scrambling modules 301 and modulated into complex symbols by modulation mappers 302, respectively. A layer mapper 303 maps the complex symbols to one or more transmit layers and a precoder 304 multiplies the complex symbols of the transmit layers by a predetermined precoding matrix W selected according to channel state and outputs complex symbols for each antenna. The precoder 304 may use both a codebook scheme and a non-codebook scheme. The complex symbols for each antenna are mapped to time-frequency resource elements to be used for transmission by resource element mappers 305 and the complex symbols for each antenna, mapped to the time-frequency resource elements, are converted into OFDM symbols for each antenna port by OFDM signal generators 306 to be transmitted via the antenna ports.

For reference, the OFDMA scheme can increase frequency efficiency and cell capacity and thus is mainly used for downlink transmission. However, the OFDMA scheme may be used for uplink transmission.

Figure 4:
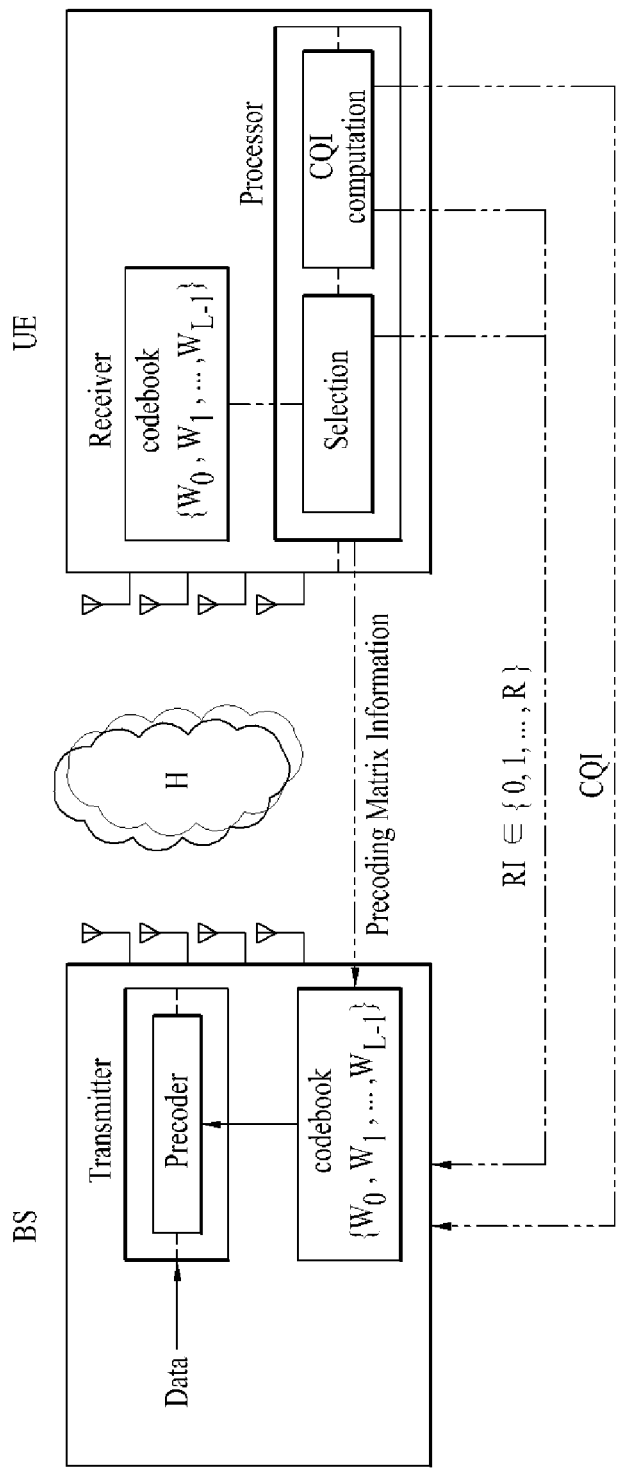
FIG. 4 is a diagram showing the outline of a Multiple Input Multiple Output (MIMO) operation.

FIG. 4 is a diagram showing the outline of a Multiple Input Multiple Output (MIMO) operation.

A BS has a precoding matrix W and a channel matrix exists between the BS and a UE. The UE estimates a channel matrix H from a reference signal (RS) from the BS, generates precoding matrix information aiding the BS in setting the precoding matrix W, and feeds the precoding matrix information back to the BS. The UE may estimate channel quality and the number of transmittable signal streams from the RS and transmit a channel quality indicator (CQI) indicating channel quality and a rank indicator (RI) indicating how many signal streams may be simultaneously transmitted.

For reference, although both the codebook scheme and the non-codebook scheme are used to set the precoding matrix W, for convenience of description, hereinafter, for example, the codebook scheme will be described. In the codebook scheme, a precoding matrix is selected based on a codebook. However, since a UE actually feeds only an index of the codebook back to a BS so as to specify a precoding matrix, the amount of feedback information can be reduced. Referring to FIG. 4, the UE may select a precoding matrix, which is estimated to minimize co-channel interference between UEs, from a codebook specifying "L" precoding matrices and transmit a precoding matrix indicator (PMI) indicating the precoding matrix to the BS. The BS selects a precoding matrix based on the PMI, multiplies data to be transmitted to the UE by the precoding matrix, and transmits the data to the UE.

Table 1 shows an example of a codebook for 2-port antenna transmission and Table 2 shows an example of a codebook for 4-port antenna transmission.

The codebook shown in Table 1 may be referred to as a 2-bit codebook because a codebook index can be specified using 2 bits and the codebook shown in Table 2 may be referred to as a 4-bit codebook because a codebook index can be specified using four bits. Although only 2-bit and 4-bit codebooks are shown, 8-bit, 16-bit and 64-bit codebooks may be further defined as the number of antenna ports is increased. In addition, although the codebooks of Tables 1 and 2 specify precoding matrices according to the LTE standard, other precoding matrices may be specified according to a wireless communication system standard. Hereinafter, for convenience of description, although the embodiments of the present invention are described using a 4-bit codebook, the present invention is applicable to codebooks of different bits.

TABLE 1

| Codebook index | Number of layers | |
|---|---|---|
| | 1 | 2 |
| 0 | $\frac{1}{\sqrt{2}}\begin{bmatrix}1\\1\end{bmatrix}$ | $\frac{1}{\sqrt{2}}\begin{bmatrix}1 & 0\\0 & 1\end{bmatrix}$ |
| 1 | $\frac{1}{\sqrt{2}}\begin{bmatrix}1\\-1\end{bmatrix}$ | $\frac{1}{2}\begin{bmatrix}1 & 1\\1 & -1\end{bmatrix}$ |
| 2 | $\frac{1}{\sqrt{2}}\begin{bmatrix}1\\j\end{bmatrix}$ | $\frac{1}{\sqrt{2}}\begin{bmatrix}1\\-j\end{bmatrix}$ |
| 3 | $\frac{1}{2}\begin{bmatrix}1 & 1\\j & -j\end{bmatrix}$ | — |

TABLE 2

| Codebook index | $u_n$ | Number of layers | | | |
|---|---|---|---|---|---|
| | | 1 | 2 | 3 | 4 |
| 0 | $u_0 = [1\ -1\ -1\ -1]^T$ | $W_0^{\{1\}}$ | $W_0^{\{14\}}/\sqrt{2}$ | $W_0^{\{124\}}/\sqrt{3}$ | $W_0^{\{1234\}}/2$ |
| 1 | $u_1 = [1\ -j\ 1\ j]^T$ | $W_1^{\{1\}}$ | $W_1^{\{12\}}/\sqrt{2}$ | $W_1^{\{123\}}/\sqrt{3}$ | $W_1^{\{1234\}}/2$ |
| 2 | $u_2 = [1\ 1\ -1\ 1]^T$ | $W_2^{\{1\}}$ | $W_2^{\{12\}}/\sqrt{2}$ | $W_2^{\{123\}}/\sqrt{3}$ | $W_2^{\{3214\}}/2$ |
| 3 | $u_3 = [1\ j\ 1\ -j]^T$ | $W_3^{\{1\}}$ | $W_3^{\{12\}}/\sqrt{2}$ | $W_3^{\{123\}}/\sqrt{3}$ | $W_3^{\{3214\}}/2$ |
| 4 | $u_4 = [1\ (-1-j)/\sqrt{2}\ -j\ (1-j)/\sqrt{2}]^T$ | $W_4^{\{1\}}$ | $W_4^{\{14\}}/\sqrt{2}$ | $W_4^{\{124\}}/\sqrt{3}$ | $W_4^{\{1234\}}/2$ |
| 5 | $u_5 = [1\ (1-j)/\sqrt{2}\ j\ (-1-j)/\sqrt{2}]^T$ | $W_5^{\{1\}}$ | $W_5^{\{14\}}/\sqrt{2}$ | $W_5^{\{124\}}/\sqrt{3}$ | $W_5^{\{1234\}}/2$ |
| 6 | $u_6 = [1\ (1+j)/\sqrt{2}\ -j\ (-1+j)/\sqrt{2}]^T$ | $W_6^{\{1\}}$ | $W_6^{\{13\}}/\sqrt{2}$ | $W_6^{\{134\}}/\sqrt{3}$ | $W_6^{\{1324\}}/2$ |
| 7 | $u_7 = [1\ (-1+j)/\sqrt{2}\ j\ (1+j)/\sqrt{2}]^T$ | $W_7^{\{1\}}$ | $W_7^{\{13\}}/\sqrt{2}$ | $W_7^{\{134\}}/\sqrt{3}$ | $W_7^{\{1324\}}/2$ |
| 8 | $u_8 = [1\ -1\ 1\ 1]^T$ | $W_8^{\{1\}}$ | $W_8^{\{12\}}/\sqrt{2}$ | $W_8^{\{124\}}/\sqrt{3}$ | $W_8^{\{1234\}}/2$ |
| 9 | $u_9 = [1\ -j\ -1\ -j]^T$ | $W_9^{\{1\}}$ | $W_9^{\{14\}}/\sqrt{2}$ | $W_9^{\{134\}}/\sqrt{3}$ | $W_9^{\{1234\}}/2$ |
| 10 | $u_{10} = [1\ 1\ 1\ -1]^T$ | $W_{10}^{\{1\}}$ | $W_{10}^{\{13\}}/\sqrt{2}$ | $W_{10}^{\{123\}}/\sqrt{3}$ | $W_{10}^{\{1324\}}/2$ |
| 11 | $u_{11} = [1\ j\ -1\ j]^T$ | $W_{11}^{\{1\}}$ | $W_{11}^{\{13\}}/\sqrt{2}$ | $W_{11}^{\{134\}}/\sqrt{3}$ | $W_{11}^{\{1324\}}/2$ |
| 12 | $u_{12} = [1\ -1\ -1\ 1]^T$ | $W_{12}^{\{1\}}$ | $W_{12}^{\{12\}}/\sqrt{2}$ | $W_{12}^{\{123\}}/\sqrt{3}$ | $W_{12}^{\{1234\}}/2$ |
| 13 | $u_{13} = [1\ -1\ 1\ -1]^T$ | $W_{13}^{\{1\}}$ | $W_{13}^{\{13\}}/\sqrt{2}$ | $W_{13}^{\{123\}}/\sqrt{3}$ | $W_{13}^{\{1324\}}/2$ |
| 14 | $u_{14} = [1\ 1\ -1\ -1]^T$ | $W_{14}^{\{1\}}$ | $W_{14}^{\{13\}}/\sqrt{2}$ | $W_{14}^{\{123\}}/\sqrt{3}$ | $W_{14}^{\{3214\}}/2$ |
| 15 | $u_{15} = [1\ 1\ 1\ 1]^T$ | $W_{15}^{\{1\}}$ | $W_{15}^{\{12\}}/\sqrt{2}$ | $W_{15}^{\{123\}}/\sqrt{3}$ | $W_{15}^{\{1234\}}/2$ |

The BS selects a precoding matrix W from a predefined codebook between the BS and the UE based on the PMI fed back from the UE and performs precoding for multiplying complex symbols of transmit layers by the selected precoding matrix W.

Figure 5:
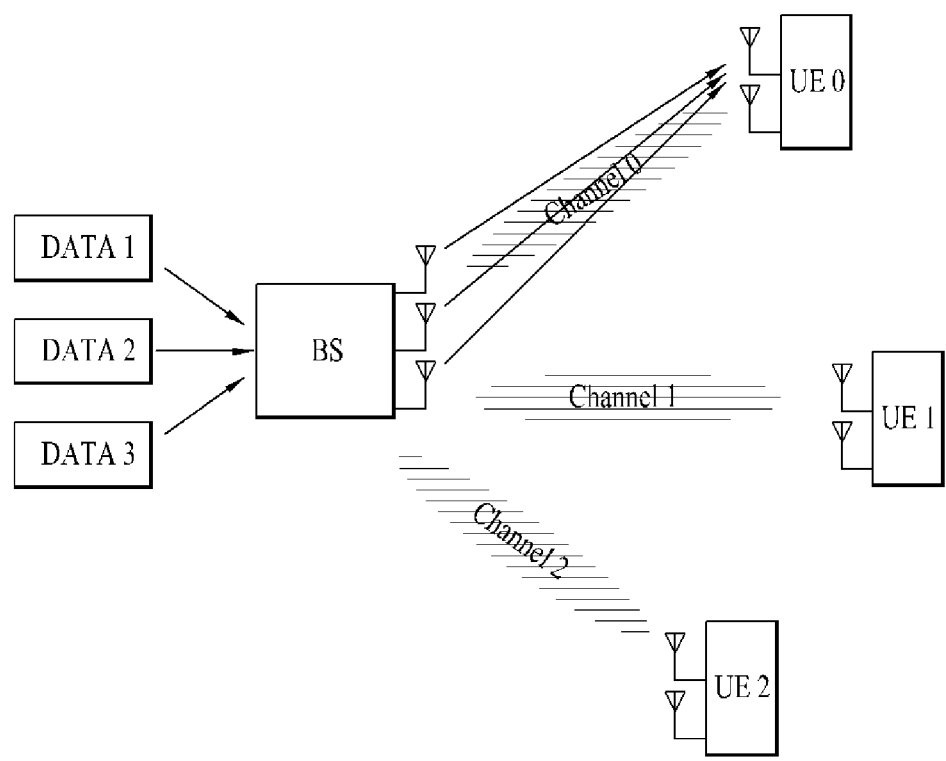
FIG. 5 is a diagram showing an example of a single user (SU)-MIMO scheme.
Figure 6:
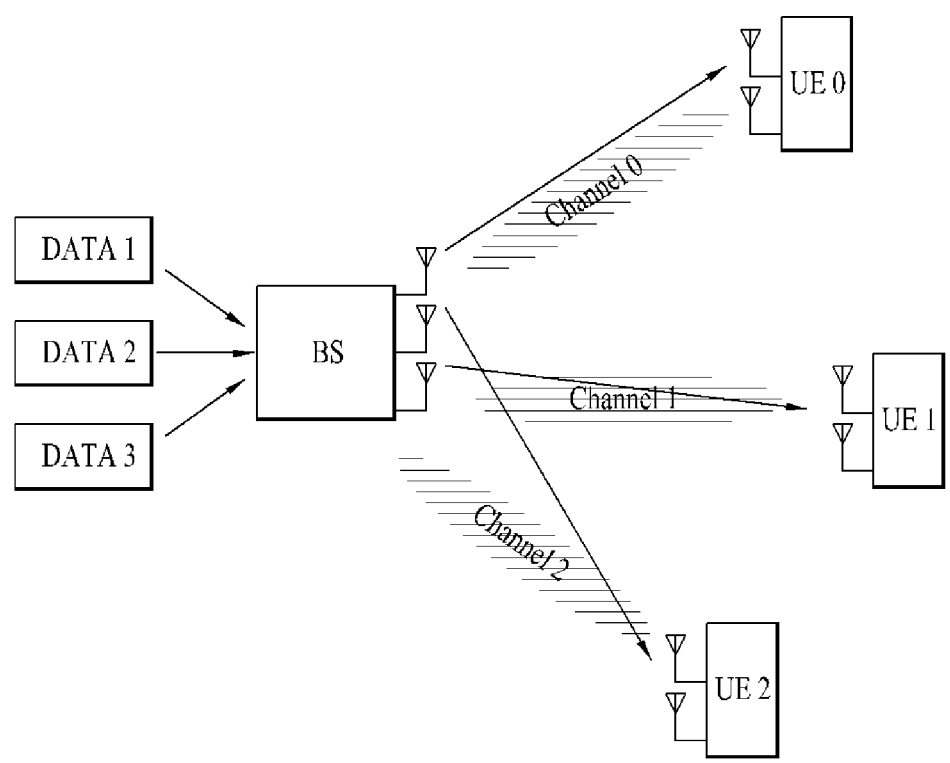
FIG. 6 is a diagram showing an example of a multiple user (MU)-MIMO scheme.

FIG. 5 is a diagram showing an example of a single user (SU)-MIMO scheme, and FIG. 6 is a diagram showing an example of a multiple user (MU)-MIMO scheme.

As shown in FIG. 5, in the SU-MIMO scheme, a plurality of different transmit streams is transmitted from a BS to one UE. In the SU-MIMO scheme, one transmitter and one receiver configure a MIMO channel. In the SU-MIMO scheme, one UE can receive all signals. That is, only data for one UE is scheduled in the same time/frequency area.

As shown in FIG. 6, in the MU-MIMO scheme, a plurality of different transmit streams is transmitted from a BS to multiple UEs. In the MU-MIMO scheme, one transmitter and multiple receivers configure a MIMO channel. That is, data for multiple UEs may be scheduled in the same time/frequency area.

Figure 7:
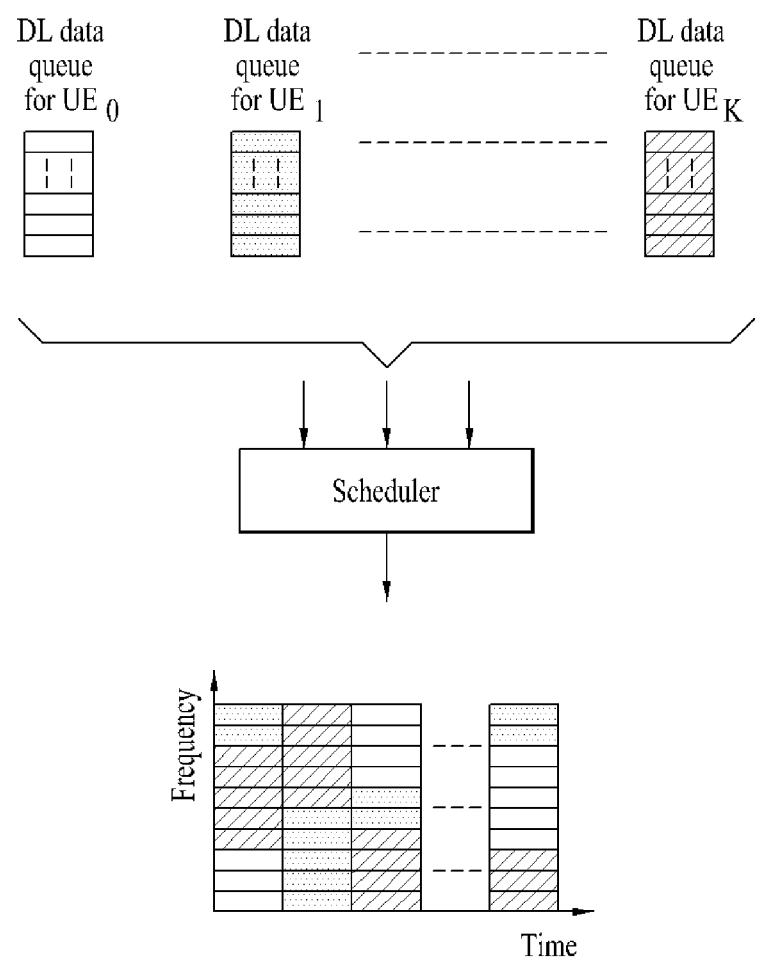
FIG. 7 is a conceptual diagram showing scheduling of data for a plurality of UEs for downlink transmission.

FIG. 7 is a conceptual diagram showing scheduling data for a plurality of UEs for downlink transmission.

A scheduler may schedule simultaneous data transmission to specific UEs based on feedback information such as a CQI, an RI or precoding matrix information from the UEs. Referring to FIG. 7, the scheduler may schedule data to be transmitted to a UE 0 ($UE_0$) to a UE K ($UE_K$) in the same time/frequency area.

For reference, the processor 400b of the BS may be configured to perform the function of the scheduler. A control station connected to the BS may include a scheduler and transmit schedule information to the BS. The scheduler may be configured as an independent module and included in the BS or the control station.

If a variety of data allocated to a frequency band of a specific part is scheduled to be transmitted during a specific duration, it is said that the data is scheduled in the same time/frequency area (or the same resource area). For example, if data for a plurality of UEs is scheduled in the same frame, the same slot, the same resource lattice or the same resource block, it is said that the plurality of UEs is scheduled in the same time/frequency area (or the same resource area).

If a plurality of UEs is located in a cell served by a BS, each of the plurality of UEs feeds back to the BS a CQI indicating quality of a channel established between each UE and the BS, a PMI for minimizing co-channel interference influencing each UE and an RI indicating how many signal streams may be simultaneously transmitted via the channel. The CQI, PMI and RI fed back from the UE to the BS may also be referred to as channel state information because this indicates a state of a channel established between a UE and a BS and may also be referred to as channel quality control information because this is used for a BS to select a transport channel or control quality of the transport channel.

The BS selects a UE to be scheduled based on PMIs, CQIs or RIs received from the plurality of UEs and sets a precoding matrix W based on the PMI received from each UE to be scheduled. At this time, a precoding matrix indicated by a PMI for minimizing co-channel interference influencing a specific UE may not be selected as a final precoding matrix by a PMI transmitted by another co-scheduled UE. For example, even when a UE 0 $UE_0$ transmits a PMI indicating an N-bit codebook index "0", a best precoding matrix $W_0$ may not be selected with respect to the UE 0, by PMIs transmitted by other UEs. That is, when the BS receives several PMIs from a plurality of UEs, the BS arbitrarily selects a matrix which will precode the data of the UEs to be co-scheduled based on the PMIs, and, at this time, the precoding matrix selected by the BS may not be a best precoding matrix of the UE 0. In this case, since interference by channels of the other co-scheduled UEs is not sufficiently reduced, performance of the downlink signal transmitted to the UE 0 may be deteriorated. In addition, as the data transmitted to the plurality of UEs is simultaneously transmitted in a predetermined resource area, co-channel interference occurs between data transmitted to different UEs in the predetermined resource area and thus performance of the wireless communication system is deteriorated.

Accordingly, in one embodiment of the present invention, given that data for a plurality of UEs is co-scheduled in the same time/frequency area, not only information indicating a best precoding matrix for data transmitted to the UE but also information indicating a precoding matrix which is to be applied to data transmitted to other co-scheduled UEs are transmitted to the BS. In other words, when a specific UE transmits feedback information to a BS, not only a best PMI suitable for the specific UE but also one or more PMIs indicating precoding matrices to be used by other UEs to be scheduled in a predetermined resource area are transmitted to the BS. For reference, hereinafter, a precoding matrix which will be applied to data to be transmitted to a specific UE is called a best precoding matrix and a precoding matrix to be used by another UE is called a best companion. If information indicating a best companion is fed back from a UE to a BS, as the size of a codebook is increased, the number of precoding matrices to be evaluated by a processor is increased. Thus, a UE requires a processor having higher processing performance and higher memory capacity for temporarily storing processed data.

Selection of Best Companion for MU-MIMO

Hereinafter, embodiments of the present invention for selecting a best companion without rapidly increasing processing performance and memory capacity will be described. FIG. 8 is a table showing an example of a 4-bit codebook. Although a 4-bit codebook is described for convenience of description, the embodiments of the present invention are equally applicable to codebooks of different sizes.

In one embodiment of the present invention, a specific UE transmits, to a BS of a serving cell to which the specific UE currently belongs, information indicating a precoding matrix which is to be applied to data to be transmitted to the specific UE and information indicating precoding matrices which will be applied to data to be transmitted to other UEs to be multiplexed in a predetermined resource area with the specific UE, that is, information indicating best companions. The best companions are not selected from all precoding matrices in a base codebook, but are selected from a codebook subset, which is composed of matrices having a predetermined relationship with the precoding matrix (hereinafter, referred to as a best precoding matrix) which will be applied to the data to be transmitted to the specific UE, among the precoding matrices of the base codebook, and information about a PMI indicating the best companions is transmitted to the BS.

If the best companions are selected from the codebook subset, preference is set with respect to the precoding matrices belonging to the codebook subset. Thus, it is possible to reduce a processing time as compared to the case where all the precoding matrices of the base codebook are evaluated so as to set preference. Since the codebook subset is composed of matrices having the predetermined relationship with the best precoding matrix, if the BS cannot select the best precoding matrix specified by the specific UE, a precoding matrix selected from the codebook subset can reduce deterioration in co-channel interference between UEs, as compared to a precoding matrix arbitrarily selected from all the precoding matrices of the base codebook.

Various criteria or algorithms for setting the codebook subset are stored in a UE and a BS. For example, the UE and the BS may include algorithms for configuring precoding matrices indicated by codebook indexes within a predetermined range from a best PMI indicating a best precoding matrix, configuring precoding matrices orthogonal to the best PMI, configuring precoding matrices having a predetermined correlation value or less, or setting precoding matrices for advantageously reducing co-channel interference in each predetermined transmission mode according to a predetermined criterion as a codebook subset.

Referring to FIG. 8, it may be predefined that a BS and a UE select precoding matrices specified by n codebook indexes before and after a codebook indicated by a PMI transmitted by the UE, m codebook indexes before the codebook or 1 codebook indexes after the codebook as a codebook subset in advance. Referring to FIGS. 2 and 4, if a best precoding matrix for a specific UE is selected, the processor 400a of the specific UE may be configured to determine precoding matrices within a predetermined range from the best precoding matrix as a codebook subset and to select best companions from the codebook subset. The processor 400a may generate precoding matrix information indicating the best precoding matrix and the best companions and control the transmitter 100a and the antenna 500a of the UE to transmit the precoding matrix information to the BS. The processor 400b of the BS may determine the best precoding matrix for the specific UE and a precoding matrix (matrices) for UE(s) multiplexed in a predetermined resource area with the specific UE based on the precoding matrix information from the specific UE. For example, assuming that a precoding matrix $W_3$ corresponding to a codebook index 3 is a best precoding matrix of a specific UE, the UE and the BS may be configured to determine a set $\{W_1, W_2, W_3, W_4, W_5\}$ including n, that is, two, precoding matrices before and after the matrix specified by the codebook index 3 as a codebook subset. Alternatively, if a set including m, that is, four, precoding matrices starting from the precoding matrix $W_3$ is defined as a codebook subset, a codebook subset $\{W_3, W_4, W_5, W_6\}$ may be determined as a codebook subset for the specific UE.

As another example, referring to FIG. 8, assuming that codebook indexes 0 to 3, 4 to 7, 8 to 11 and 12 to 15 are respectively composed of orthogonal precoding matrices, a set composed of orthogonal precoding matrices may be set as a codebook subset. For reference, there is a high probability that a precoding matrix for minimizing co-channel interference between a channel of a specific UE and a channel of another UE may be orthogonal to a precoding matrix for providing an optimal signal to the specific UE. That is, as a matrix having low correlation with the best precoding matrix for the specific UE may minimize interference between the channel of the specific UE and the channel of the other UE. Referring to FIGS. 2 and 4, the processor 400a of the UE may be configured to determine which of the precoding matrices of the base codebook is used as a best precoding matrix thereof and to determine a best companion from matrices orthogonal to the best precoding matrix. The processor 400a of the UE may control the transmitter 100a and the antenna 500a of the UE so as to transmit precoding matrix information indicating the best precoding matrix and the best companions to the UE.

As another example, if $W_x$, $W_y$, and $W_z$ defined in the base codebook are set to minimize co-channel interference in a specific transmission mode in advance, a set $\{W_x, W_y, W_z\}$ may be set as a codebook subset. Referring to FIGS. 2 and 4, a codebook subset according to a specific transmission mode may be defined in advance between a UE and a BS. The processor 400a of the UE may determine a best precoding matrix thereof and best companions for other UEs from a codebook subset corresponding to the specific transmission mode, and control the transmitter 100 and the antenna 500a to transmit information indicating the best precoding matrix and the best companions to the BS.

Hereinafter, for convenience of description, embodiments of selecting a best companion and embodiments of feeding information indicating best companions back when precoding matrices having an orthogonal relationship are set as a codebook subset will be described. However, the following embodiments are applicable to codebook subsets set according to different criteria in addition to the codebook subset composed of the precoding matrices having the orthogonal relationship.

Referring to FIG. 8, precoding matrices indicated by codebook indexes 0 to 3 have an orthogonal relationship, precoding matrices indicated by codebook indexes 4 to 7 have an orthogonal relationship, precoding matrices indicated by codebook indexes 8 to 11 have an orthogonal relationship, and precoding matrices indicated by codebook indexes 12 to 15 have an orthogonal relationship.

If it is assumed that a best precoding matrix of a UE 0 corresponds to a codebook "1", the UE may select a best companion from among the precoding matrices of the codebook indexes 0, 2 and 3 and transmit a best companion PMI indicating the best companion to the BS along with the best PMI indicating the best precoding matrix. The BS may select precoding matrices for the data to be transmitted to the UEs based on the best PMI indicating the best precoding matrix and the best companion PMI indicating the best companion received from the UE 0, and best PMIs and best companion PMIs received from other UEs to be co-scheduled in a predetermined resource area.

The number of best companions selected by the UE may depend on the number of UEs able to be co-scheduled or the number of signal streams able to be co-scheduled. If the number of selectable best companions depends on the number of UEs or the number of signal streams able to be co-scheduled and, for example, the UE 0 may simultaneously receive three signal streams, a rank is "3", the UE 0 may determine two best companions among $W_0$, $W_2$ and $W_3$ orthogonal to a best precoding matrix $W_1$ and feed information indicating the best precoding matrix $W_1$ and the two best companions back to the BS. For example, the two best companions for the UE 0 among $W_0$, $W_2$ and $W_3$ orthogonal to the best precoding matrix $W_1$ may be selected in order of $W_3$ and $W_0$ and information indicating $W_1$, $W_3$ and $W_0$ is fed back to the BS. Referring to FIGS. 2 and 4, the processor 400a of the UE may determine the best precoding matrix $W_1$ thereof from among the precoding matrices in the codebook stored in the memory 200a of the UE or the processor 400a of the UE, select $W_3$ and $W_0$ from the codebook subset $\{W_0, W_1, W_2, W_3\}$ composed of the precoding matrices orthogonal to $W_1$, and control the transmitter 100a of the UE to transmit precoding matrix information sequentially indicating $W_1$, $W_3$ and $W_0$ to the BS.

For reference, if best companions are associated with ranks, since the number of best companions indicates the number of signal streams able to be simultaneously received by the UE, the same effect as transmission of the RI along with the PMI can be obtained. Accordingly, if the number of precoding matrices selected by the UE depends on rank, the processor 400a of the UE may not generate an RI and may control the transmitter 100a of the UE so as not to transmit the RI even when the RI is generated in order to reduce feedback overhead. The processor 400b of the BS may determine the number of precoding matrices specified by the UE, information about which precoding matrix is specified, and the number of streams which may be received by each UE from the fed-back precoding matrix information.

A predetermined number of best companions may be selected regardless of a rank and information indicating the best companions may be fed back to the BS. For example, if the number of precoding matrices able to be specified by the UE is three, a best precoding matrix and two best companions may be selected in order of preference and information indicating a total of four precoding matrices may be fed back to the BS even when the rank of the UE is "2".

Feedback of Information about Best Precoding Matrix and Best Companions

Hereinafter, embodiments of feeding information indicating a best precoding matrix and best companions back to a BS will be described. For convenience of description, it is assumed that a UE 0 selected from a 4-bit codebook selects a best precoding matrix $W_1$, a best companion $W_3$ selected from a codebook subset having a predetermined relationship with $W_1$ and a second best companion $W_2$ and feeds information indicating the same back to a BS. That is, the UE 0 selects $W_1$ as a precoding matrix which is to be applied to data to be transmitted to the UE 0 and selects best companions $W_3$ and $W_1$ in this order as best companions for minimizing interference with the UE 0 as precoding matrices which are to be applied to data to be transmitted to the other UEs, in consideration of the fact that there are other UEs to be multiplexed in a predetermined resource area with the UE 0. Hereinafter, a PMI indicating a precoding matrix $W_k$ is referred to as $PMI_k$. Hereinafter, information indicating a best precoding matrix and best companions is collectively referred to as precoding matrix information.

Feedback Embodiment 1

In one embodiment of the present invention, a UE may transmit PMIS for a best precoding matrix and best companions selected from a codebook subset having a predetermined relationship with the best precoding matrix to a BS as precoding matrix information.

For example, the UE 0 may transmit, to the BS, $PMI_1$ for a precoding matrix $W_1$, $PMI_3$ for a precoding matrix $W_3$, and $PMI_0$ for a precoding matrix $W_0$ in this order.

Referring to FIGS. 2 and 4, the processor 400a of the UE may control the transmitter 100a of the BS to transmit $PMI_1$ for the best precoding matrix $W_1$, $PMI_3$ for the first precoding matrix $W_3$, and $PMI_0$ for the second precoding matrix $W_0$.

In case of a 4-bit codebook, since each PMI is represented by 4 bits, according to the present embodiment, a total of 12 bits is necessary for feedback of the precoding matrix information. If the number of specified best companions is increased, the amount of feedback information to be transmitted to the BS is proportionally increased. Even when a MIMO order is increased and thus a codebook index is increased, the amount of feedback information is increased. For example, in case of an 8-bit codebook, 3×8 bits, that is, 24 bits, are necessary to feed three PMIs back. As a result, increase in the number of best companions or increase in MIMO order may lead to feedback overhead.

The following Feedback Embodiments 2 to 7 are advantageous in that feedback overhead can be reduced, as compared to Embodiment 1.

Feedback Embodiment 2

A UE and a BS set patterns according to priority of matrices of a codebook subset in advance and the UE may transmit information indicating a preferred pattern to the BS as precoding matrix information along with information indicating a best precoding matrix.

For example, three precoding matrices may be sequentially selected from a codebook subset {$W_0$, $W_2$, $W_3$} having a predetermined relationship with a best precoding matrix $W_1$ and a total of six patterns may be set in advance with respect to each specific best precoding matrix and codebook subset ($_3P_3$=6). An example thereof is shown as follows. For reference, the same number of patterns can be set by sequentially selecting three precoding matrices from the codebook subset {$W_0$, $W_2$, $W_3$} ($_3P_2$=6).

TABLE 3

| Pattern Index | 1$^{st}$ best companion | 2$^{nd}$ best companion | 3$^{rd}$ best companion |
|---|---|---|---|
| 000 | $W_0$ | $W_2$ | $W_3$ |
| 001 | $W_0$ | $W_3$ | $W_2$ |
| 010 | $W_2$ | $W_0$ | $W_3$ |
| 011 | $W_2$ | $W_3$ | $W_0$ |
| 100 | $W_3$ | $W_0$ | $W_2$ |
| 101 | $W_3$ | $W_2$ | $W_0$ |

If a best precoding matrix for the UE 0 is $W_1$ and the order of preferred best companions, that is, the order of precoding matrices for minimizing interference between the UE and other UEs is $W_2$, $W_0$ and $W_3$, the UE 0 may feed 4 bits of PMI indicating the best precoding matrix $W_1$ and 3 bits of a pattern index sequentially indicating the best companions $W_2$, $W_0$ and $W_3$ back to the BS. For reference, if the best precoding matrix of a UE 1 is $W_2$, a best companion pattern for the UE 1 is determined by a combination of $W_0$, $W_1$ and $W_3$ and, if a best precoding matrix of a UE 3 belongs to a codebook subset different from $W_1$, a precoding matrix pattern for the UE 3 is determined by a combination of precoding matrices of the different codebook subset.

Referring to FIGS. 2, 3 and 8 and Table 3, the processor of the UE 0 may configure precoding matrix information using a total of 7 bits of a PMI bit stream "0001" and a pattern index bit stream "010" and control the transmitter and antenna of the UE to feed the precoding matrix information to the BS. The antenna of the BS receives the precoding matrix information and the processor of the BS may determine the best precoding matrix $W_1$ for the UE 0 and a precoding matrix pattern group associated with $W_1$ using the first 4 bits and determine that the order of best companions for the UE 0 among the precoding matrix patterns associated with $W_1$ is $W_1$, $W_0$ and $W_3$ using the next 3 bits.

The processor of the BS may select precoding matrices to be applied to UEs to be co-scheduled in a predetermined resource area based on 7 bits of the precoding matrix information transmitted from the UE 0 and the precoding matrix information transmitted from other UEs. The processor 400b of the BS may control the transmitter 100b of the BS to apply the selected precoding matrices such that the data for the UEs are precoded. The processor 400b of the BS may control the transmitter 100b of the BS to transmit the precoded data of the UEs in the predetermined resource area.

Feedback Embodiment 3

A UE and a BS set patterns according to priority of matrices of a codebook subset in advance and the UE may transmit information indicating a codebook subset including a preferred pattern and information indicating the preferred pattern to the BS as precoding matrix information.

For example, a 4-bit base codebook may be divided into three 2-bit codebook subsets and patterns of precoding matrices of each codebook subset may be set. If a codebook subset to which a best precoding matrix $W_1$ of a UE 0 belongs is $\{W_0, W_1, W_2, W_3\}$, a total of 24 patterns may be set per codebook subset by sequentially selecting four precoding matrices from the codebook subset ($_4P_4$=24). For reference, the same number of patterns can be set by sequentially selecting three precoding matrices from the codebook subset $\{W_0, W_1, W_2, W_3\}$ ($_4P_3$=24). An example of patterns according to which four matrices configuring the codebook subset $\{W_0, W_1, W_2, W_3\}$ are sequentially arranged may be presented as follows.

TABLE 4

| Pattern Index | Best Matrix | 1$^{st}$ best companion | 2$^{nd}$ best companion | 3$^{rd}$ best companion |
|---|---|---|---|---|
| 00000 | $W_0$ | $W_1$ | $W_2$ | $W_3$ |
| 00001 | $W_0$ | $W_1$ | $W_3$ | $W_2$ |
| 00010 | $W_0$ | $W_2$ | $W_1$ | $W_3$ |
| 00011 | $W_0$ | $W_2$ | $W_3$ | $W_1$ |
| 00100 | $W_0$ | $W_3$ | $W_1$ | $W_2$ |
| 00101 | $W_0$ | $W_3$ | $W_2$ | $W_1$ |
| 00110 | $W_1$ | $W_0$ | $W_2$ | $W_3$ |
| 00111 | $W_1$ | $W_0$ | $W_2$ | $W_3$ |
| 01000 | $W_1$ | $W_2$ | $W_0$ | $W_3$ |
| 01001 | $W_1$ | $W_2$ | $W_3$ | $W_0$ |
| 01010 | $W_1$ | $W_3$ | $W_0$ | $W_2$ |
| 01011 | $W_1$ | $W_3$ | $W_2$ | $W_0$ |
| 01100 | $W_2$ | $W_0$ | $W_1$ | $W_3$ |
| 01101 | $W_2$ | $W_0$ | $W_3$ | $W_1$ |
| 01110 | $W_2$ | $W_1$ | $W_0$ | $W_3$ |
| 01111 | $W_2$ | $W_1$ | $W_3$ | $W_0$ |
| 10000 | $W_2$ | $W_3$ | $W_0$ | $W_1$ |
| 10001 | $W_2$ | $W_3$ | $W_1$ | $W_0$ |
| 10010 | $W_3$ | $W_0$ | $W_1$ | $W_2$ |
| 10011 | $W_3$ | $W_0$ | $W_2$ | $W_1$ |
| 10100 | $W_3$ | $W_1$ | $W_0$ | $W_2$ |
| 10101 | $W_3$ | $W_1$ | $W_2$ | $W_0$ |
| 10110 | $W_3$ | $W_2$ | $W_0$ | $W_1$ |
| 10111 | $W_3$ | $W_2$ | $W_1$ | $W_0$ |

A total of 2 bits is necessary to indicate the codebook subset $\{W_0, W_1, W_2, W_3\}$ among a total of four codebooks, and a total of 5 bits is necessary to indicate a pattern preferred by a UE among a total of 24 patterns. If it is assumed that the codebook subset $\{W_0, W_1, W_2, W_3\}$ is a first codebook subset, a best precoding matrix preferred by a UE 0 is $W_1$ and best companions are $W_2$, $W_0$ and $W_3$, in this order, referring to FIGS. 2 and 8 and Table 4, the processor of the UE 0 may configure precoding matrix information using a total of 2 bits of a bit stream "00" indicating the codebook subset and 5 bits of a pattern index bit stream "01000" sequentially indicating the precoding matrices $W_1$, $W_2$, $W_0$, $W_3$ and control the transmitter and antenna of the UE 0 to feed the precoding matrix information back to the BS. The antenna and receiver of the BS receive the 7 bits of precoding matrix information from the UE 0 and the processor of the BS may determine the codebook subset $\{W_0, W_1, W_2, W_3\}$, to which the preferred precoding matrices of the UE 0 belongs, through the first 2 bits of the precoding matrix information and determine that the best precoding matrix for the UE 0 is $W_1$ and the preferred best companions are sequentially $W_2$, $W_0$ and $W_3$, through the next 5 bits. The processor of the BS may select precoding matrices to be applied to UEs to be co-scheduled, that is, multiplexed, in a predetermined resource area based on 7 bits of the precoding matrix information transmitted from the UE 0. That is, the processor of the BS may select the precoding matrices to be applied to the data to be transmitted to the UE 0 based on the best precoding matrix W fed back by the UE 0 and the best companions transmitted from other UEs and select precoding matrices to be applied to the other UEs based on the best companions indicated by the UE 0 and the best precoding matrix and best companions fed back by the other UEs. The processor of the BS may control the transmitter 100b of the BS to apply the selected precoding matrices such that the data to be transmitted to the UE multiplexed in the predetermined resource area are precoded. The processor 400b of the BS may control the transmitter 100b of the BS to simultaneously transmit the data to be transmitted to the UEs co-scheduled in the predetermined resource area to the UEs through the predetermined resource area.

Feedback Embodiment 4

Information indicating a codebook subset which is defined between a UE and a BS in advance and information indicating a precoding matrix in the codebook subset may be transmitted to the BS as precoding matrix information.

For example, assuming that four codebook subsets each including four precoding matrices are defined in the UE and the BS, 2 bits are necessary to indicate a codebook subset and 2 bits are necessary whenever one precoding matrix is indicated in the codebook subset. For example, if the best precoding matrix of the UE 0 is included in a first codebook subset $\{W_1, W_2, W_0, W_3\}$, the best precoding matrix of the UE 0 is $W_1$ and the order of preferred best companions is $W_1$, $W_2$, $W_0$, $W_3$, the processor of the UE 0 may sequentially indicate preferred precoding matrices in the first codebook subset using a total of 8 bits including 2 bits indicating the first codebook subset, 2 bits indicating the best precoding matrix $W_1$ among the four precoding matrices of the first codebook subset, 2 bits indicating the best companion $W_2$ and 2 bits indicating the second best companion $W_0$. That is, the processor of the UE 0 may configure 8 bits of precoding matrix information and control the transmitter and antenna of the UE 0 to transmit the precoding matrix information to the BS. The BS may receive the 8 bits of precoding matrix information from the UE 0 through the antenna and the receiver and the processor of the BS may determine the codebook subset $\{W_0, W_1, W_2, W_3\}$, to which the best precoding matrix and best companions for the UE 0 belong, through the first 2 bits of the precoding matrix information, determine the best precoding matrix $W_1$ through the next 2 bits, determine the first best companion $W_2$ through the next 2 bits, and determine the second best companion $W_0$ through the next 2 bits. The processor of the BS may select precoding matrices to be applied to UEs to be co-scheduled in a predetermined resource area based on the 8 bits of precoding matrix information transmitted from the UE 0 and the precoding matrix information transmitted from the other UEs. The processor of the BS may control the transmitter 100b of the BS such that the data to be transmitted to the co-scheduled UEs are precoded using the selected precoding matrices. The transmitter 100b of the BS may transmit the precoded data to the predetermined UEs through the predetermined resource area under control of the processor 400b of the BS.

Feedback Embodiment 5

Information indicating a codebook subset which is defined between a UE and a BS in advance and information indicating a precoding matrix in the codebook subset may be transmitted to the BS, best companions are selected from precoding matrices except for precoding matrices, which are prioritized in advance in the codebook subset, and precoding matrix information may be transmitted to the BS.

For example, assuming that four codebook subsets each including four precoding matrices are defined in the UE and the BS, 2 bits are necessary to indicate a codebook subset and 2 bits are necessary to indicate a best precoding matrix for the UE among the four matrices of the codebook subset, 2 bits are necessary to indicate a first best companion among the remaining three matrices, and 1 bit is necessary to indicate one of the remaining two matrices. That is, the UE may sequentially indicate a preferred precoding matrix thereof and best companions, which are to be applied to other UEs, using a total of 7 bits and feed the same back to the BS.

For example, if the best precoding matrix $W_1$ of the UE 0 is included in a first codebook subset $\{W_0, W_1, W_2, W_3\}$ and the order of best companions which are to be applied to the data to be transmitted to the other UEs is $W_2$, $W_0$ and $W_3$, the processor of the UE 0 may configure precoding matrix information sequentially indicating the preferred precoding matrix and best companions in the first codebook subset using a total of 7 bits including 2 bits indicating the first codebook subset among the four codebook subsets, 2 bits indicating a best precoding matrix $W_1$ among the four precoding matrices of the first codebook subset, 2 bits indicating a best companion $W_2$ among the remaining three precoding matrices and 1 bit indicating the second best companion $W_0$ among the remaining two precoding matrices. The processor of the UE 0 may control the transmitter and the antenna to feed the precoding matrix information back to the BS. The BS receives and send the 7 bits of precoding matrix information from the UE 0 through the antenna and the receiver to the processor of the BS and the processor of the BS may determine the codebook subset $\{W_0, W_1, W_2, W_3\}$, to which the preferred precoding matrix and best companion(s) of the UE 0 belong, through the first 2 bits of the precoding matrix information, determine the best precoding matrix $W_1$ of the UE 0 through the next 2 bits, determine that the first best companion is $W_2$ through the next 2 bits, and determine that the second best companion is $W_0$ through the next 1 bit. The processor of the BS may select the precoding matrices to be applied to the UEs to be co-scheduled in a predetermined resource area based on the 7 bits of precoding matrix information transmitted from the UE 0 and the precoding matrix information transmitted from the other UEs. The processor of the BS may control the transmitter 100b of the BS such that the data to be transmitted to the co-scheduled UEs are precoded using the selected precoding matrices. The transmitter 100b of the BS may transmit the precoded data to the predetermined UEs through the predetermined resource area under control of the processor 400b of the BS.

Feedback Embodiment 5

A UE may transmit a PMI indicating a best precoding matrix and information indicating best companions in the codebook subset, to which the PMI belongs, to a BS as precoding matrix information.

For example, if a best precoding matrix of a UE 0 is $W_1$, a codebook subset including $W_1$ is $\{W_0, W_1, W_2, W_3\}$ and the order of preferred best companions of the UE 0 is $W_2$, $W_0$ and $W_3$, the processor of the UE 0 may configure a total of 8 bits including 4 bits indicating $W_1$ in a 4-bit codebook, 2 bits indicating $W_2$ in the codebook subset $\{W_0, W_1, W_2, W_3\}$ to which $W_1$ belongs and 2 bits indicating $W_0$ as precoding matrix information and control the transmitter and antenna of the UE 0 to transmit the precoding matrix information to the BS. The BS may receive the 8 bits of precoding matrix information through the antenna and the receiver and determine the best precoding matrix $W_1$ for the UE 0 through the first 4 bits and the codebook subset $\{W_0, W_1, W_2, W_3\}$, to which $W_1$ belongs, through $W_1$. In addition, the BS may determine that the best companion is $W_2$ through the next 2 bits and determine that the next best companion is $W_0$ through the next 2 bits. The processor of the BS may select precoding matrices to be applied to the UEs to be co-scheduled based on the 8 bits of precoding matrix information transmitted from the UE 0 and the precoding matrix information transmitted from the other UEs. In addition, the processor of the BS may control the transmitter 100b of the BS such that the data to be transmitted to the co-scheduled UEs are precoded using the selected precoding matrices. The transmitter 100b of the BS may transmit the precoded data to the predetermined UEs through the predetermined resource area under control of the processor 400b of the BS.

Feedback Embodiment 6

A UE may transmit a PMI indicating a best precoding matrix and information indicating best companions in the codebook subset, to which the PMI belongs, to a BS as precoding matrix information, and the best companions are selected from among the remaining matrices except for the precoding matrices, which are prioritized in advance in the codebook subset, and precoding matrix information may be transmitted to the BS.

For example, if a best precoding matrix of a UE 0 is $W_1$, a codebook subset including $W_1$ is $\{W_0, W_1, W_2, W_3\}$ and the order of preferred best companions of the UE 0 is $W_2$, $W_0$ and $W_3$, the processor of the UE 0 may transmit a total of 7 bits including 4 bits indicating $W_1$ in a 4-bit codebook, 2 bits indicating $W_2$ from among three precoding matrices except for $W_1$ in the codebook subset $\{W_0, W_1, W_2, W_3\}$ to which $W_1$ belongs, and 1 bit indicating $W_0$ from between two precoding matrices except for $W_1$ and $W_2$ to the BS as precoding matrix information. The BS may receive the 7 bits of precoding matrix information through the antenna and the receiver and determine the best precoding matrix $W_1$ for the UE 0 through the first 4 bits and the codebook subset $\{W_0, W_1, W_2, W_3\}$, to which $W_1$ belongs, through $W_1$. In addition, the BS may determine that the best companion is $W_2$ through the next 2 bits and determine that the next best companion is $W_0$ through the next 1 bit. The processor of the BS may select precoding matrices to be applied to the UEs to be co-scheduled based on the 7 bits of precoding matrix information transmitted from the UE 0 and the precoding matrix information transmitted from the other UEs. In addition, the processor of the BS may control the transmitter 100b of the BS such that the data to be transmitted to the co-scheduled UEs are precoded using the selected precoding matrices. The transmitter 100b of the BS may transmit the precoded data to the predetermined UEs through the predetermined resource area under control of the processor 400b of the BS.

For reference, although information indicating a best companion having lowest priority in the codebook subset is not separately transmitted in Feedback Embodiments 4 and 5, information indicating a best companion $W_3$ having lowest priority may be included in precoding matrix information to be transmitted. Even when a best companion having lowest priority is not indicated, the BS may determine that $W_3$ among four precoding matrices is a best companion having lowest preference with respect to the UE 0 by indicating the remaining three precoding matrices.

Feedback Embodiment 7

When information indicating a best companion is transmitted, only change from a previously selected best companion may be transmitted.

For example, "1" may be transmitted after a bit indicating $W_1$ so as to indicate that a best companion is $W_2$ which is located next to $W_1$.

The BS may receive precoding matrix information from UEs within an area served by the BS and select UEs to be co-scheduled based on the precoding matrix information of the UEs. For example, it is assumed that a UE 0 feeds precoding matrix information indicating a best precoding matrix and best companions back to a BS in order of $W_0$, $W_3$ and $W_1$, a UE 1 feeds precoding matrix information indicating a best precoding matrix and best companions back to the BS in order of $W_3$, $W_1$ and $W_2$, a UE 2 feeds precoding matrix information indicating a best precoding matrix and best companions back to the BS in order of $W_5$, $W_7$ and $W_4$, and a UE 3 feeds precoding matrix information indicating a best precoding matrix and best companions back to the BS in order of $W_3$, $W_1$ and $W_0$. The processor 400b of the BS may select scheduling of the UEs 0 and 3 to which the common precoding matrix is applied and control a precoder of the BS to precode the data to be transmitted to the UE 0 using $W_0$ and to precode the data to be transmitted to the UE 3 using $W_3$. The processor of the BS may control a resource element mapper such that the precoded data to be transmitted to the UE 0 and the UE 3 is allocated to a predetermined resource area. The transmitter of the BS transmits the data to the UE 0 and the UE 3 in the predetermined resource area, that is, in a frequency and time area of the predetermined resource area, under control of the processor of the BS.

As described above, although a 4-bit base codebook is described in the above embodiments, base codebooks of other bits may be applied.

The embodiments of the present invention are equally applicable to SU-MIMO in addition to MU-MIMO. If the embodiments of the present invention are applied regardless of MU-MIMO or SU-MIMO, a UE transmits precoding matrix information of a predetermined form to a BS without considering which UEs are co-scheduled or how many UEs are co-scheduled.

The embodiments of the present invention may be equally applied not only to the case in which one or a plurality of UEs within one cell served by one BS feed precoding matrix information back to the BS but also to the case of applying MIMO transmission to a multi-cell environment. That is, the embodiments of the present invention may be equally applied not only to single-cell MIMO but also to multi-cell MIMO. Hereinafter, the case in which the embodiments of the present invention are applied to multi-cell MIMO will be described with reference to FIG. 1.

Referring to FIG. 1, a single-cell MIMO user 160 within a single cell communicates with one serving BS in one cell (sector) and a multi-cell MIMO user 150 located at a cell boundary communicates with multiple serving BSs in multiple cells (sectors) so as to improve throughput of UEs located at the cell boundary, which is referred to as a coordinated multi-point (CoMP) system. The CoMP system may also be called a multi-BS MIMO system, a network MIMO system or a coordinated MIMO system.

In single-cell MIMO, each BS (cell) transmits a signal to one or multiple UEs within a coverage area thereof using a MIMO scheme. At this time, signals transmitted from contiguous BSs should be transmitted within respective cell radii thereof. When a signal transmitted from a BS is handed over to a contiguous BS, inter-cell interference occurs. In contrast, in multi-cell MIMO, contiguous BSs transmit different MIMO symbols transmitted to one UE. That is different BSs far away from each other transmit symbols to the UE, thereby forming a better channel matrix than single-cell MIMO. That is, if a CoMP system is applied, inter-cell interference can be reduced in a multi-cell environment. If such a CoMP system is applied, a UE may receive data from a multi-cell BS. Each BS simultaneously supports communication with one or more UEs $UE_0$, $UE_1$, ..., and $UE_K$ using the same radio frequency resources so as to improve system performance. In addition, a BS may perform a space division multiple access (SDMA) method based on channel state information between the BS and the UE.

Such a CoMP scheme may be divided into a cooperative MIMO-based Joint Processing (JP) scheme through data sharing and a CoMP-Coordinated Scheduling/Coordinated Beamforming (CoMP-CS/CB) scheme. In addition, the CoMP system includes transmission processors (e.g., multiple antennas) which are geographically separated from each other in addition to the cooperative MIMO-based JP scheme and the CoMP-CS/CB scheme.

In a CoMP system, a serving BS and one or more cooperative BSs are connected to a scheduler via a backhaul 140. Since each BS may separately includes a scheduler for scheduling a signal to be transmitted to UEs located in a coverage area thereof, a scheduler for scheduling signals of one or more BSs may be referred to as a master scheduler in order to differentiate the same from a scheduler of each base station. The master scheduler may receive information about channel states between the UEs $UE_0$, $UE_1$, ..., and $UE_K$ and the cooperative BSs, which are measured by BSs $BS_0$, $BS_1$, ..., and $BS_M$ via the backhaul 140 to operate. For example, the master scheduler schedules information for a cooperative MIMO operation with respect to the serving BS and one or more cooperative BSs. That is, the scheduler may directly instruct the cooperative MIMO operation to each BS.

The embodiments of the present invention may be equally applied to such a CoMP system. Each of UEs which receive different symbols from a plurality of BSs may feed a best precoding matrix and best companions thereof to each of the plurality of BSs according to the embodiments of the present invention. The master scheduler may receive the precoding matrix information of each UE, which is received by each BS via the backhaul 140, select UEs to be co-scheduled from among several UEs within an area of the plurality of BSs, and allocate data of the selected UEs to the same time/frequency area. Each BS may allocate the selected UEs within the coverage area thereof to the same time/frequency area under control of the master scheduler.

For example, it is assumed that a UE 0 $UE_0$ feeds precoding matrix information, in which a best precoding matrix and best companions are indicated in order of $W_0$, $W_3$ and $W_1$, back to an eNB A, a UE 1 $UE_1$ feeds precoding matrix information, in which a best precoding matrix and best companions are indicated in order of $W_2$, $W_1$ and $W_3$, back to an eNB A, a UE 2 $UE_2$ feeds precoding matrix information, in which a best precoding matrix and best companions are indicated in order of $W_5$, $W_7$ and $W_4$, back to an eNB A, a UE 3 $UE_3$ feeds precoding matrix information, in which a best precoding matrix and best companions are indicated in order of $W_3$, $W_1$ and $W_0$, back to an eNB A and an eNB B, a UE 4 $UE_4$ feeds precoding matrix information, in which a best precoding matrix and best companions are indicated in order of $W_8$, $W_{11}$ and $W_{12}$, to an eNB B, and a UE 5 $UE_5$ feeds precoding matrix information, in which a best precoding matrix and best companions are indicated in order of $W_1$, $W_2$ and $W_0$, back to an eNB B. The master scheduler receives the precoding matrix information of the UEs 0, 1, 2, 3, 4 and 5 from the eNB A and the eNB B, co-schedules the UE 0 and UE 3, which coincide with each other in terms of the best precoding matrix and best companions, based on the received precoding matrix information, and transmits the scheduling information to the eNB A, co-schedules the UE 1 and UE 5, which coincide with each other in terms of the best precoding matrix and best companions, based on the received precoding matrix information, and transmits the scheduling information to the eNB B. In addition, the master scheduler may select precoding matrices for the co-scheduled UEs based on the precoding matrix information received from each BS and inform the BS of the precoding matrices. Since the best precoding matrix of the UE 0 is $W_0$, best companions thereof are $W_3$ and $W_1$, the best precoding matrix of the UE 3 is $W_3$, and best companions thereof are $W_1$ and $W_0$, the master scheduler may transmit the precoding matrix $W_0$ for the UE 0 and the precoding matrix $W_3$ for the UE 3 to the eNB A. In addition, since the best precoding matrix of the UE 1 is $W_2$, best companions thereof are $W_1$ and $W_3$, the best precoding matrix of the UE 5 is $W_1$, and best companions thereof are $W_2$ and $W_0$, the master scheduler may transmit the precoding matrix $W_2$ for the UE 1 and the precoding matrix $W_1$ for the UE 5 to the eNB B. Then, the processor of the eNB A may control the transmitter of the eNB A to precode the data to be transmitted to the UE 0 using $W_0$, to precode the data to be transmitted to the UE 3 using $W_3$ and to transmit the data to the UEs 0 and 3 and control the transmitter of the eNB B to precode the data to be transmitted to the UE 1 using $W_2$, to precode the data to be transmitted to the UE 5 using $W_1$ and to transmit the data to the UEs 1 and 5.

The master scheduler selects UEs to be co-scheduled based on the precoding matrix information received from each BS, schedules the selected UEs, and transmits the scheduling information to the BS, and the BS selects precoding matrices. For example, if the master scheduler co-schedules UEs 0 and 3 and transmits scheduling information to the eNB A and co-schedules UEs 1 and 5 and transmits scheduling information to the eNB B, the processor of the eNB A may select precoding matrices to be applied to data to be transmitted to the UE 0 and data to be transmitted to the UE 3 based on the precoding matrix information from the co-scheduled UE 0 and UE 3. Similarly, the processor of the eNB B may select precoding matrices to be applied to data to be transmitted to the UE 1 and data to be transmitted to the UE 5 based on the precoding matrix information from the co-scheduled UE 1 and UE 5. The transmitter of the eNB A precodes the data to be transmitted to the UE 0 and the UE 3 using the selected precoding matrices and transmits the precoded data to the UE 0 and the UE 3 in a predetermined resource area. Similarly, the transmitter of the eNB B precodes the data to be transmitted to the UE 1 and the UE 5 using the selected precoding matrices and transmits the precoded data to the UE 1 and the UE 5 in a predetermined resource area.

The master scheduler selects only UEs to be co-scheduled, transmits information about the UEs to each BS, and the BS allocates data to be transmitted to the selected UEs to the same time/frequency area and select precoding matrices to be applied to the data to be transmitted to the UEs. For example, if the master scheduler transmits information indicating that the UEs 0 and 3 are co-scheduled to the eNB A and transmits information indicating that the UEs 1 and 5 are co-scheduled to the eNB B, the processors of the eNB A allocates the data to be transmitted to the UEs 0 and 3 to the same time/frequency area and selects a precoding matrix $W_0$ for the UE 0 and a precoding matrix $W_3$ for the UE 3 based on the precoding matrix information of the UEs 0 and 3, and the processor of the eNB B allocates the data to be transmitted to the UEs 1 and 5 to the same time/frequency area and selects a precoding matrix $W_1$ for the UE 1 and a precoding matrix $W_1$ for the UE 3 based on the precoding matrix information of the UEs 1 and 5. The transmitter of the eNB A may precode data to be transmitted to the UE 0 using $W_0$, precode data to be transmitted to the UE 3 using $W_3$ and transmit the precoded data to the UEs 0 and 3 in the time and frequency area of the predetermined resource area through antennas, under control of the processor. The transmitter of the eNB B precodes data to be transmitted to the UE 1 using $W_2$, precodes data to be transmitted to the UE 5 using $W_1$ and transmits the precoded data to the UEs 1 and 5 in the time and frequency area of the predetermined resource area through antennas, under the control of the processor.

Instead of the mater scheduler, feedback information received by different BSs is received via the backhaul 140 on a BS-by-BS basis so as to select UEs to be co-scheduled and precoding matrices. For example, the processor of the eNB A co-schedules the UEs 0 and 3 based on the precoding matrix information transmitted from the UEs 0, 1, 2 and 3, controls the precoder of the eNB A to precode data to be transmitted to the UEs 0 and 3 using $W_0$ and $W_3$ and controls the transmitter and antenna of the eNB A to transmit the precoded data to the UEs 0 and 3 in a predetermined resource area.

If the embodiments of the present invention are applied to a CoMP system, it is possible to reduce inter-cell interference occurring at a boundary between different cells and co-channel interference by a plurality of co-scheduled UEs.

The detailed description of the exemplary embodiments of the present invention has been given to enable those skilled in the art to implement and practice the invention. Although the invention has been described with reference to the exemplary embodiments, those skilled in the art will appreciate that various modifications and variations can be made in the present invention without departing from the spirit or scope of the invention described in the appended claims. For example, those skilled in the art may use each construction described in the above embodiments in combination with each other. Accordingly, the invention should not be limited to the specific embodiments described herein, but should be accorded the broadest scope consistent with the principles and novel features disclosed herein.

INDUSTRIAL APPLICABILITY

The embodiments of the present invention are applicable to a base station, a user equipment and other apparatuses in a wireless communication system.

The invention claimed is:

1. A method of transmitting precoding matrix information by a first user equipment (UE) in a wireless communication system in which a plurality of UEs simultaneously receive a signal from a base station, the method comprising:
    determining a first precoding matrix which is a precoding matrix for the first UE within a predetermined codebook and determining one or more second precoding matrices for other UEs to be multiplexed in a predetermined resource area with the first UE within a codebook subset associated with the first precoding matrix among codebook subsets of the predetermined codebook; and
    transmitting codebook subset information indicating the codebook subset associated with the first precoding matrix and precoding matrix information indicating a preferred pattern among precoding matrix patterns, each of the precoding matrix patterns defining a priority order between precoding matrices of the codebook subset associated with the first precoding matrix, for indicating the first and second precoding matrices.

2. The method according to claim 1, wherein the codebook subset associated with the first precoding matrix includes the first precoding matrix and a precoding matrix having a predetermined correlation value or less with the first precoding matrix.

3. A first user equipment (UE) for transmitting precoding matrix information in a wireless communication system in which a plurality of UEs simultaneously receive a signal from a base station, the first UE comprising:
   a transmitter configured to transmit a signal to the base station; and
   a processor configured to determine a first precoding matrix for the first UE within a predetermined codebook, determine one or more second precoding matrices for other UEs to be multiplexed in a predetermined resource area with the first UE within a codebook subset associated with the first precoding matrix among codebook subsets of the predetermined codebook, and control the transmitter to transmit codebook subset information indicating the codebook subset associated with the first precoding matrix and precoding matrix information indicating a preferred pattern among precoding matrix patterns, each of the recoding matrix patterns defining a priority order between precoding matrices of the codebook subset associated with the first precoding matrix, for indicating the first and second precoding matrices.

4. The first UE according to claim 3, wherein the codebook subset associated with the first precoding matrix includes the first precoding matrix and a precoding matrix having a predetermined correlation value or less with the first precoding matrix.

5. A method of transmitting data at a base station (BS) in a wireless communication system in which the BS simultaneously transmits a signal to a plurality of user equipments (UEs), the method comprising:
   receiving codebook subset information indicating a codebook subset associated with a first precoding matrix among codebook subsets of a predetermined codebook and precoding matrix information indicating a preferred pattern among precoding matrix patterns, each of the precoding matrix patterns defining a priority order between precoding matrices of the codebook subset associated with the first precoding matrix, for indicating the first precoding matrix for a first UE of the plurality of UEs within the predetermined codebook and one or more second precoding matrices for other UEs to be multiplexed in a predetermined resource are with the first UE, the one or more second precoding matrices being determined within the codebook subset associated with the first precoding matrix;
   selecting a precoding matrix for data to be transmitted to each UE in the predetermined resource area based on the codebook subset information and the precoding matrix information; and
   precoding the data to be transmitted to the each UE using the selected precoding matrix and transmitting the data to the each UE in the predetermined resource area.

6. A base station (BS) for receiving data in wireless communication system in which the BS simultaneously transmits a signal to a plurality of user equipments (UEs), the BS comprising:
   an antenna configured to receive codebook subset information indicating a codebook subset associated with a first precoding matrix among codebook subsets of a predetermined codebook and precoding matrix information indicating a preferred pattern among precoding matrix patterns, each of the precoding matrix patterns defining a priority order between precoding matrices of the codebook subset associated with the first precoding matrix, for indicating a first precoding matrix for a first UE of the plurality of UEs within the predetermined codebook and one or more second precoding matrices for other UEs to be multiplexed in a predetermined resource area with the first UE, the one or more second precoding matrices being for other UEs to be multiplexed in a predetermined resource area with the first UE, the one or more second precoding matrices being determined within the codebook subset associated with the first precoding matrix;
   a precoder configured to precode data to be transmitted; and
   a processor configured to select a precoding matrix for data to be transmitted to each UE in the predetermined resource area based on the codebook subset information and the precoding matrix information, control the precoder to precode the data to be transmitted, and control the antenna to transmit the precoded data to the each UE in the predetermined resource area.

7. The method according to claim 1, wherein the codebook subset information indicates the codebook subset associated with the first precoding matrix by indicating the first precoding matrix among precoding matrices included in the predetermined codebook, and the precoding matrix pattern indicated by the precoding matrix information defines priority order between precoding matrices of the codebook subset associated with the precoding matrix other than the first precoding matrix.

8. The method according to claim 1, wherein the codebook subset information indicates the codebook subset associated with the first precoding matrix by indicating one of codebook subsets of the predetermined codebook, and the first precoding matrix is a precoding matrix having the highest order among precoding matrices of the codebook subset associated with the first precoding matrix.

9. The method according to claim 1, wherein the number of second precoding matrices depends on the number of the other UEs.

10. The first UE according to claim 3, wherein the codebook subset information indicates the codebook subset associated with the first precoding matrix by indicating the first precoding matrix among precoding matrices included in the predetermined codebook, and the precoding matrix pattern indicated by the precoding matrix information defines priority order between precoding matrices of the codebook subset associated with the precoding matrix other than the first precoding matrix.

11. The first UE according to claim 3, wherein the codebook subset information indicates the codebook subset associated with the first precoding matrix by indicating one of codebook subsets of the predetermined codebook, and the first precoding matrix is a precoding matrix having the highest order among precoding matrices of the codebook subset associated with the first precoding matrix.

12. The first UE according to claim 3, wherein the number of second precoding matrices depends on the number of the other UEs.

13. The method according to claim 5, wherein the codebook subset information indicates the codebook subset associated with the first precoding matrix by indicating the first precoding matrix among precoding matrices included in the predetermined codebook, and the precoding matrix pattern indicated by the precoding matrix information defines priority order between precoding matrices of the codebook subset associated with the precoding matrix other than the first precoding matrix.

14. The method according to claim 5, wherein the codebook subset information indicates the codebook subset associated with the first precoding matrix by indicating one of codebook subsets of the predetermined codebook, and the first precoding matrix is a precoding matrix having the highest order among precoding matrices of the codebook subset associated with the first precoding matrix.

15. The method according to claim 5, wherein the number of second precoding matrices depends on the number of the other UEs.

16. The BS according to claim 6, wherein the codebook subset information indicates the codebook subset associated with the first precoding matrix by indicating the first precoding matrix among precoding matrices included in the predetermined codebook, and the precoding matrix pattern indicated by the precoding matrix information defines priority order between precoding matrices of the codebook subset associated with the precoding matrix other than the first precoding matrix.

17. The BS according to claim 6, wherein the codebook subset information indicates the codebook subset associated with the first precoding matrix by indicating one of codebook subsets of the predetermined codebook, and the first precoding matrix is a precoding matrix having the highest order among precoding matrices of the codebook subset associated with the first precoding matrix.

18. The BS according to claim 6, wherein the number of second precoding matrices depends on the number of the other UEs.

* * * * *